United States Patent [19]

Mosher

[11] 4,155,272

[45] May 22, 1979

[54] LOW COST CAM CONTROLLED POSITIONING APPARATUS

[75] Inventor: Ralph S. Mosher, Elnora, N.Y.

[73] Assignee: Robotics, Incorporated, Ballston Spa, N.Y.

[21] Appl. No.: 734,415

[22] Filed: Oct. 21, 1976

[51] Int. Cl.$^2$ ............................................. G05G 11/00
[52] U.S. Cl. ..................................... 74/479; 33/1 M; 414/744; 414/749
[58] Field of Search ...................... 74/53, 54, 55, 479; 214/1 BB, 1 BC, 1 BT, 1 BH; 51/165.89; 33/1 M, 18 B

[56] References Cited

U.S. PATENT DOCUMENTS

| | | | |
|---|---|---|---|
| 1,386,332 | 8/1921 | Hendrickson | 33/18 B |
| 1,489,892 | 4/1924 | Loughridge | 214/1 BC |
| 1,573,205 | 2/1926 | Taylor et al. | 33/18 B |
| 1,883,204 | 10/1932 | Whitaker | 33/18 B |
| 2,086,523 | 7/1937 | Burdette et al. | 33/18 B |
| 3,148,452 | 9/1964 | Rabenau | 33/18 B |
| 3,413,862 | 12/1968 | Waara | 74/53 |
| 3,818,769 | 6/1974 | Tigner et al. | 74/55 |
| 3,878,652 | 4/1975 | Mosher | 214/1 CM |
| 3,881,362 | 5/1975 | Beezer | 33/18 B |

FOREIGN PATENT DOCUMENTS

| | | | |
|---|---|---|---|
| 76627 | 5/1918 | Czechoslovakia | 33/18 B |
| 119014 | 9/1918 | United Kingdom | 33/18 B |

*Primary Examiner*—Irwin C. Cohen
*Attorney, Agent, or Firm*—Charles W. Helzer

[57] ABSTRACT

A low cost cam controlled mechanical positioning apparatus for automatically tracing out a predetermined path of movement for the working head of a machine tool or the like is described. The apparatus comprises a set of two large diameter disc type control-drive cams secured in parallel planes on a common drive shaft rotatably supported on a base member and driven by an electric motor through suitable gearing. Respective cam followers engage cam surfaces formed on the undersides of the large diameter control-drive disc cams and are connected to respective linkages for translating movement of the cam follower to a working head to thereby move the working head in a predetermined path of movement in an x-y plane. A working head supporting boom is secured to a transport mechanism which is movably supported on wheel and track elements and mounted for movement along respective x and y axes by the respective linkages driven by the cam followers. The plane of the x-y movement of the working head is parallel to the planes of the control-drive disc cams and the control-drive disc cams are supported on the base member in a position to overlie and interleave with the linkage and transport mechanism to thereby form a compact design.

20 Claims, 9 Drawing Figures

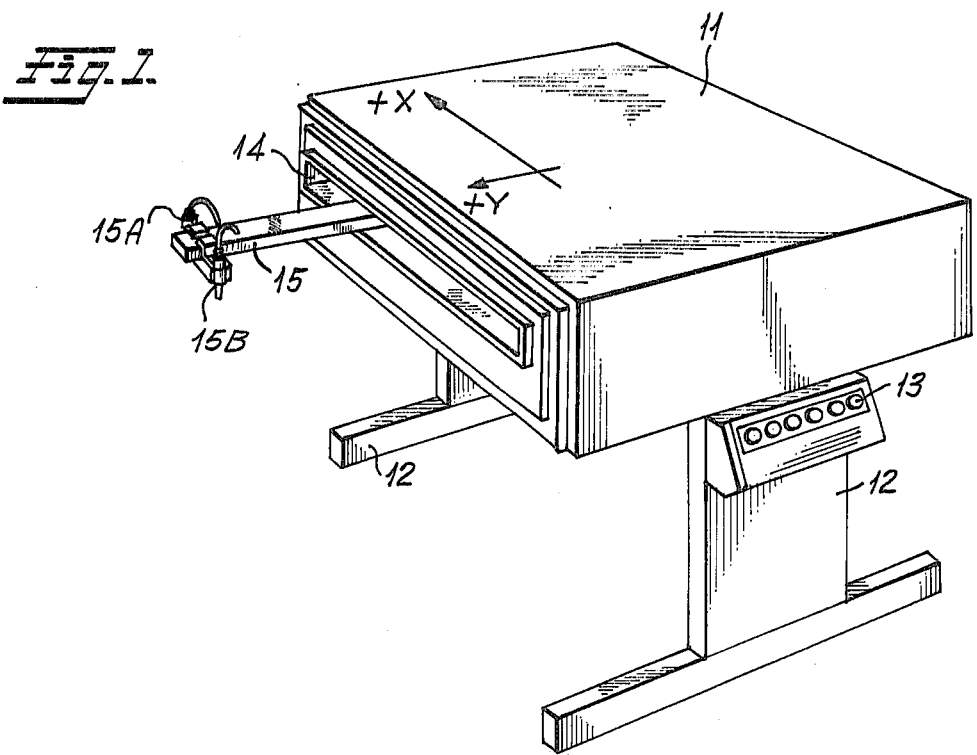
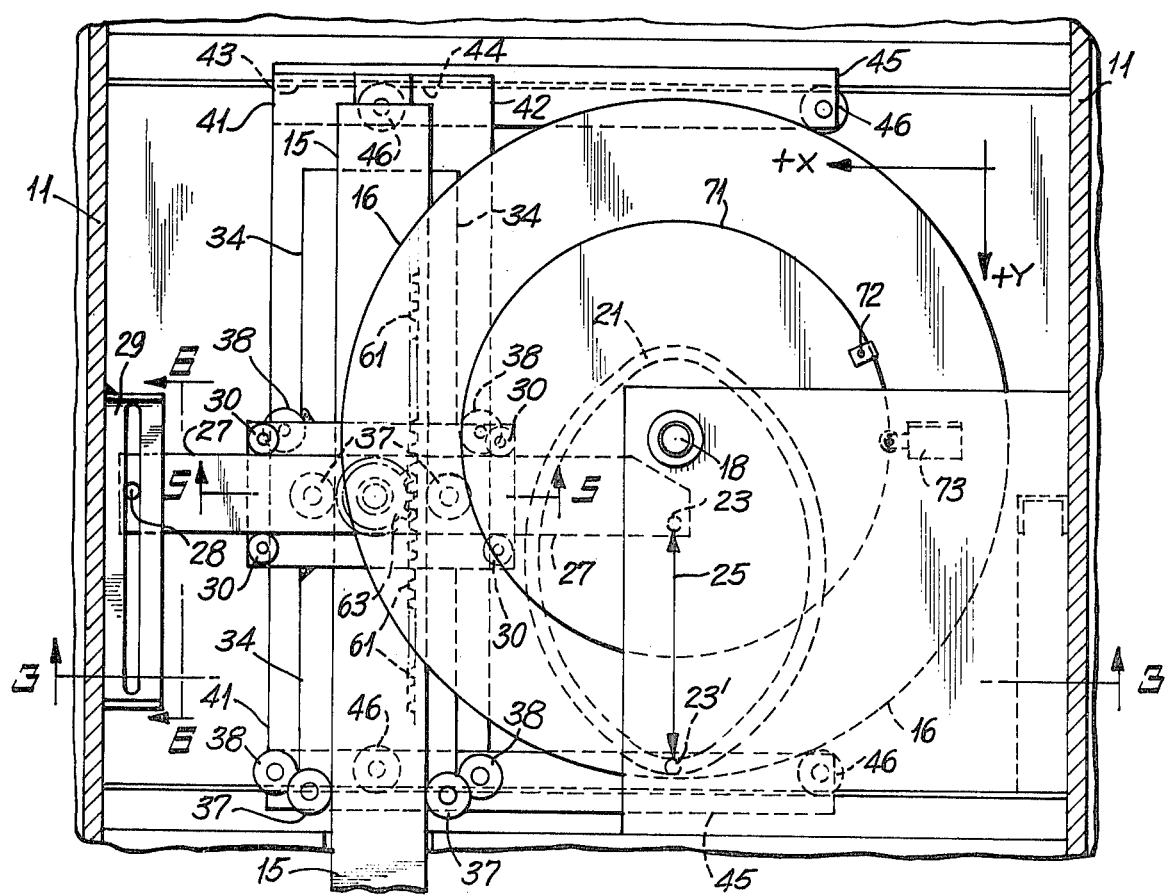

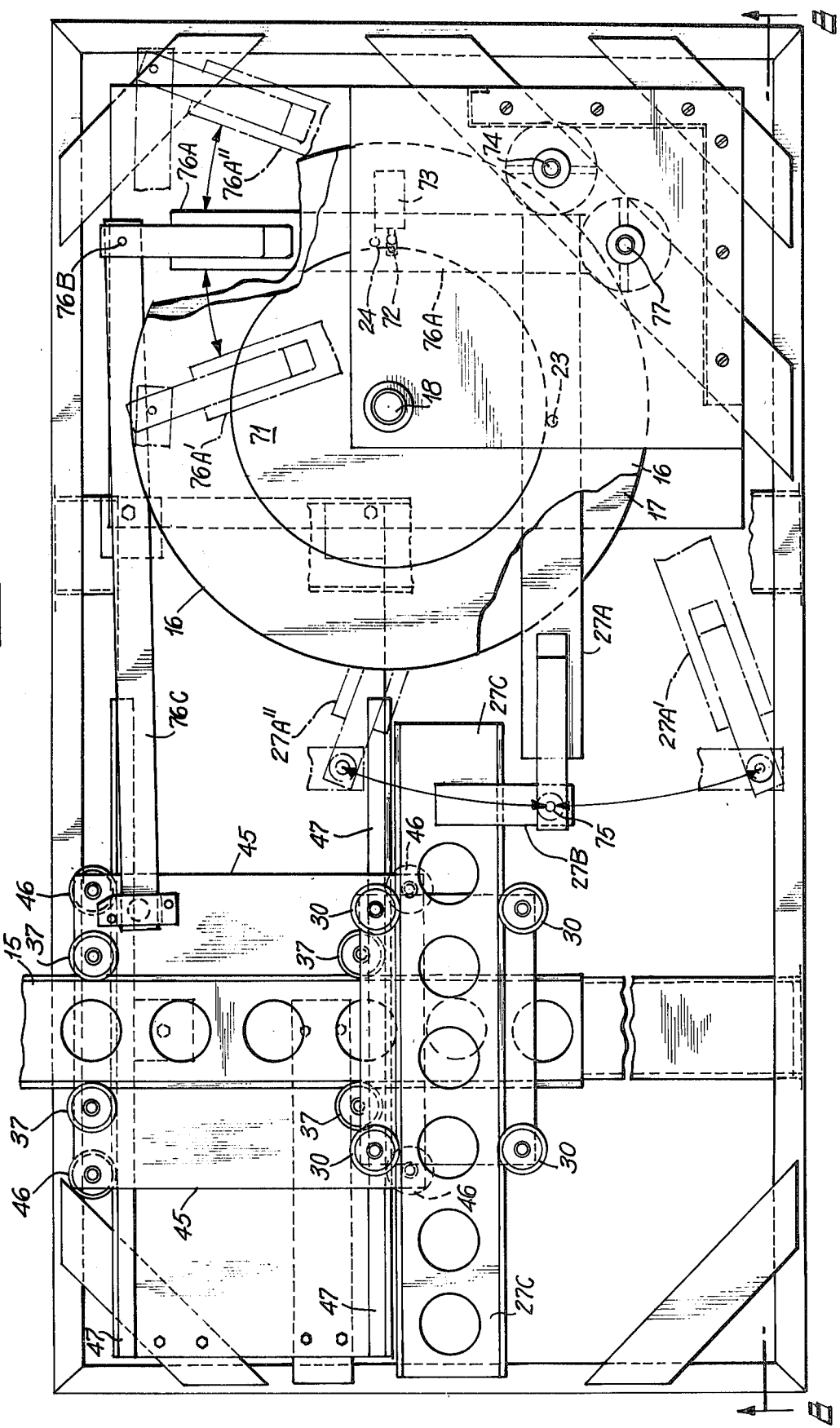

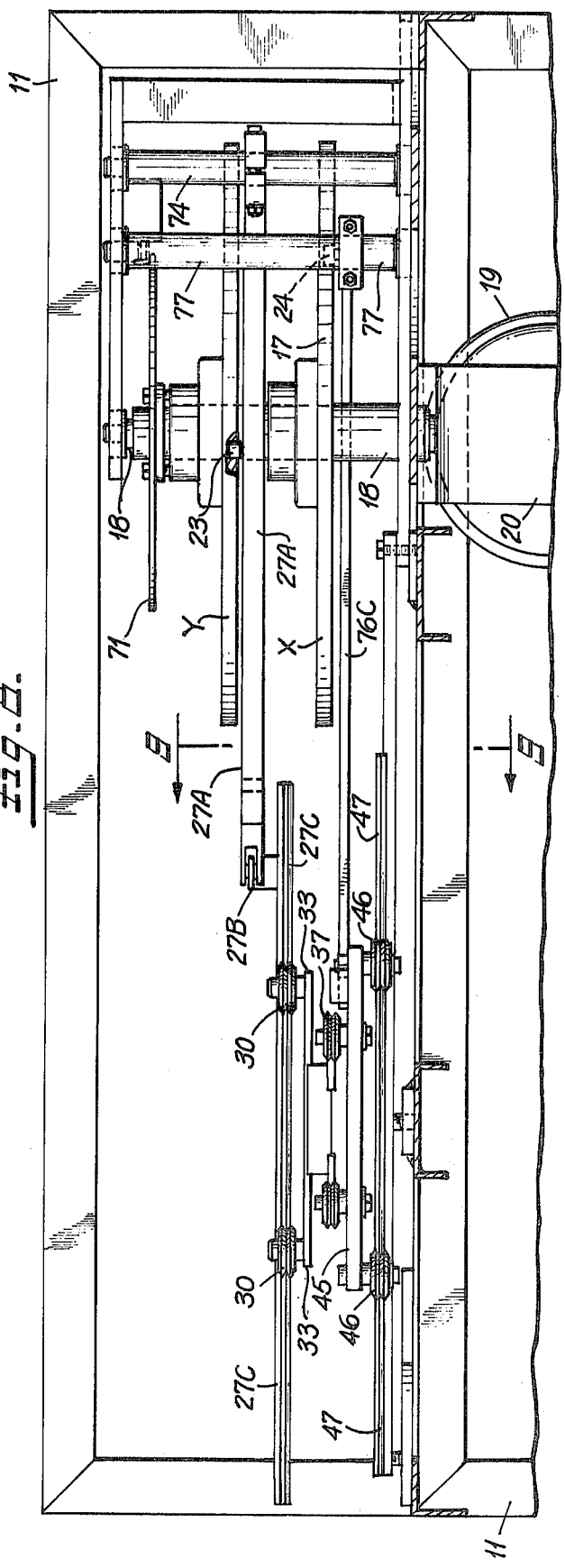
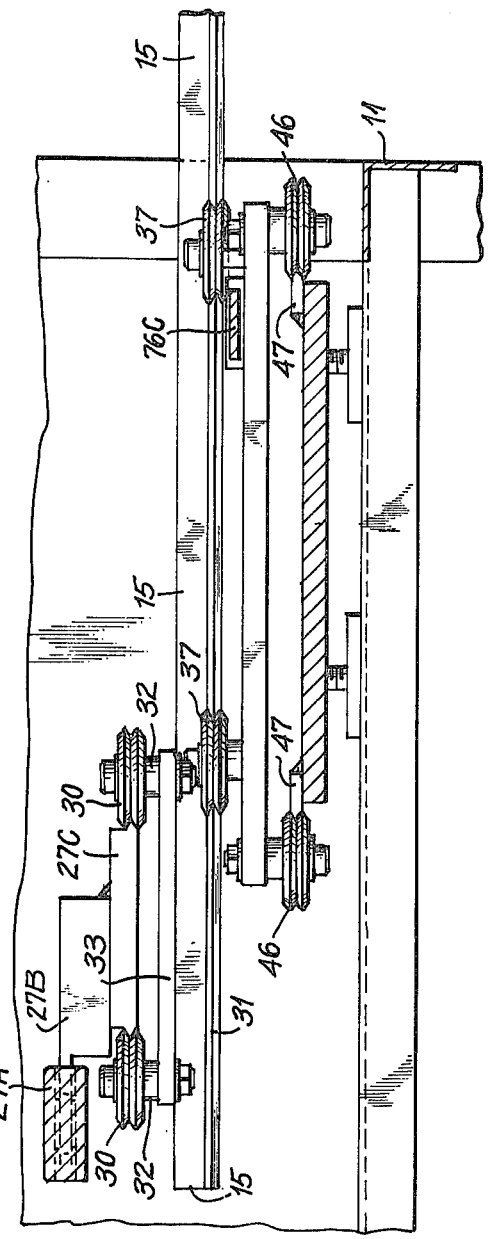

LOW COST CAM CONTROLLED POSITIONING APPARATUS

BACKGROUND OF INVENTION

1. Field of Invention

This invention relates to an automatic positioning mechanism for automatically moving the working head of a machine tool or other similar device through a pre-programmed pattern of movement.

More particularly, the invention relates to such an automatic positioning mechanism which is simple in design, relatively low cost, reliable in operation and easy to maintain; and which employs simple mechanical disc-type control-drive cams both to control the pattern of movement and to drive the apparatus.

2. Background Problem

There are a number of known mechanisms driven by mechanical cams to generate a variety of shapes in space. One of these known mechanisms is described in U.S. Pat. No. 3,818,769 issued June 25, 1974 for an "Apparatus for Repeated Tracing Various Patterns". All of the known mechanisms of this type are designed for limited performance to do simple point to point patterns of motion and/or are limited in size and amount of detail that can be generated per operating cycle of the mechanism. Recent developments in the automotive industry for dispensing a mastic-like material as a formed-in-place gasket on automotive parts, and on other similar products, has caused the need for simple mechanisms of this same general type but with much more capability than that possessed by the known prior art mechanisms. To satisfy this last mentioned need, the range of motion must be large, the shape must be accurate in details of intricate shapes and it must be extremely reliable. There are basic inherent shortcomings in generating patterns of motion with a mechanically driven cam technique. The size of the follower and the size of the cam greatly influences the amount of detail that can be included in the shape of contour of the cam patterns. To satisfy this need the present invention was developed.

SUMMARY OF INVENTION

In order to overcome the inherent shortcomings of the known prior art mechanical cam driven mechanisms, and still take advantage of the simplicity, ruggedness and dependability of this kind of mechanism, the present invention makes available a system which utilizes very large diameter disc-type cams which store and reproduce extensively detailed patterns of motion. The mechanism is designed so that the cam followers move either in a straight line extension of a single radius of the circular large diameter disc cams, or alternatively employ a swinging arc motion for amplification of the cam follower motion. Two large diameter disc cams are used in each mechanism, one for each direction of motion (x and y) and the size of the disc-type control-drive cams ranges between 20 and 40 inches in diameter. Consequently, the length of detailed cam surface contour travelled by the cam follower is 4 to 10 times longer or greater than that provided by known mechanical cam driven systems. Movement produced in a cam follower by the detailed cam surface contour is translated to a transport mechanism by a suitable linkage coupling. The transport mechanism supports and moves a boom on which the working head of a machine tool or other similar apparatus is mounted. The transport mechanism is movably supported on wheel and track elements and mounted for movement along respective x and y axes which form a plane of movement that is parallel to the planes of the control-drive cams. The control-drive cams are supported on a base member in a position to overlie and interleave with the linkage and transport mechanisms to thereby form an apparatus which is compact in construction.

The relatively large diameter disc-type control-drive cams are generally circular in shape and have a diameter of the order of 20 to 40 inches with the control-drive cam surfaces being formed at points along a radius of the cam whereby the radius of the large diameter disc cam defines the full stroke of movement of the cam follower. Substantially greater detail in the formation of the control-drive cam surfaces is achievable by a factor of 4 or 5 to 1 over the detail achieved with conventional control cam designs. The control-drive cam surfaces formed in the disc-type cams comprise grooves formed in corresponding flat surfaces of the cams with the grooves being double acting in effect whereby bidirectional control of movement of the cam follower is achieved. The cams are mounted on a common drive shaft that has its axis extending in a vertical up and down direction and the flat surfaces of the control-drive disc-type cams on which the cam grooves are formed are downwardly disposed whereby the cam surfaces are protected from the deposition of dirt or other matter and minimal frictional contact resistance with the cam follower is achieved.

The cam follower, the linkage and the transport mechanism all are constructed of light weight durable material such as aluminum whereby minimum inertia effects are attained and dynamic forces acting on the apparatus are maintained at a low level. The contour of the cam surfaces formed in the respective control-drive cams is designed to include the kinematics of the follower, the linkage and the transport mechanism in order to provide a desired motion pattern for the working head of the apparatus and there is not a 1 to 1 correspondence between the contour of the control-drive cam surfaces and the path of movement of the working head.

In a preferred embodiments of the invention, the mechanical movement amplifying means are supported on the transport mechanism and act on the boom to which the working head is secured for amplifying and extending the movement translated to the working head by the transport mechanism along at least one axis of movement. This mechanical movement amplifying means is comprised by telescoping boom means and differential gear means for telescopically extending the telescoping boom. The differential gear means is responsive to movement of the transport mechanism along at least one axis of movement for mechanically amplifying movement induced in the transport mechanism along the said one axis of movement by the control cam surface, cam follower and linkage means.

A controller-actuator disc is mounted coaxially with the disc-type control-drive cams on the rotatable drive shaft and further includes electrical encoding means peripherally arrayed around the controller-actuator disc and engageable thereby at certain peripheral points during rotation of the disc whereby electrical control signals are produced for controlling desired auxiliary functions at predetermined paths in the movements of the working head.

The disc-type control-drive cams are designed to be readily removed and replaced with other disc-type control-drive cams having differently programmed control cam surfaces formed therein for producing a different pattern of movement for the working head.

In one form of the apparatus the linkage between the cam follower and the transport mechanism is designed to move along paths which are defined by straight line extensions of a radius of the large diameter disc-type control-drive cams.

In another form of the apparatus, the linkage between the cam follower and the transport mechanism comprises at least one pivoted swinging arc linkage arm having its respective cam follower engaging an intermediate point thereon between a pivoted end and a swinging arc free end for mechanically amplifying the movement induced by the control-drive cam and cam follower at the swinging arc free end. The swinging arc free end of the respective linkage arm is connected to the transport mechanism for providing a greater scope of movement than the scope of movement of the cam follower. In such an arrangement, the contour of the cam surfaces formed in the respective control-drive cam is designed to compensate for the swinging arc movement of the swinging arc free end of the linkage arm to convert the movement to rectilinear movement.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 1 is a perspective view of the present invention;

FIG. 2 is a fragmentary plan of the apparatus of FIG. 1, partly in section, with the surrounding housing structure omitted for purposes of clarity;

FIG. 7 is a fragmentary plan view of another embodiment of the apparatus;

FIG. 8 is a fragmentary longitudinal vertical sectional view taken on the line 8—8 of FIG. 7; and FIG. 9 is a fragmentary transverse vertical sectional view taken on the line 9—9 of FIG. 8.

DETAILED DESCRIPTION OF PREFERRED EMBODIMENTS

Figure 3:
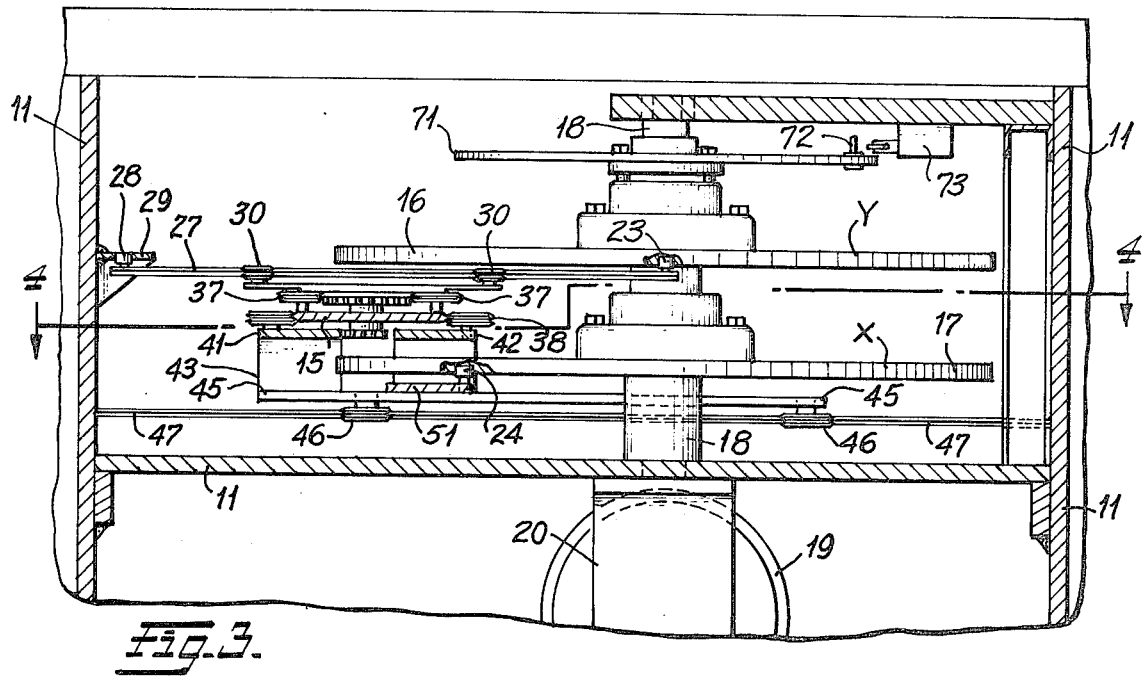
FIG. 3 is a fragmentary vertical sectional view taken on the line 3—3 of FIG. 2.

FIG. 1 is a perspective overall view of a new and improved, low cost, cam controlled, mechanical positioning apparatus constructed in accordance with the invention. The apparatus shown in FIG. 1 is comprised by a base or housing member 11 which supports all of the elements of the apparatus to be described hereinafter on a set of spaced apart pedestal legs 12 on which a suitable operator's panel 13 also may be mounted. The base or housing member 11 has an opening 14 extending along one transverse side thereof through which a movable boom means or member 15 extends. The movable boom 15 can be moved not only transversely along the longitudinal axis of the opening 14 in housing or base member 11, but also may be moved into and out of the opening along an axis orthogonal to the longitudinal axis of the opening 14. For convenience, in the following description, movement of the boom 15 in either direction along the transverse axis of the opening 14 shall be defined as movement along the x axis, and movement of the boom 15 into or out of the plane of the opening 14 shall be defined as movement along the y axis. Thus, it will be appreciated that the boom 15 can be moved to any point within the x-y plane encompassed by the scope of its movement and has supported thereon a pair of working heads 15A and 15B. For illustration, it will be assumed that the working heads 15A and 15B comprise nozzles or other suitable ejectors for a mastic material to be applied as a gasket to the head of an automobile engine, or other similar device. It is believed obvious to those skilled in the art that the working heads 15A and/or 15B could also comprise cutting tools, milling tools, riveting head, welding heads, or the like for performing suitable work at particular points in the pattern of movement induced in the boom 14 by the positioning mechanisms to be described hereinafter.

The positioning apparatus shown in FIG. 1 is designed to perform a control function such as that carried out by the programmable remote control machine tool manipulator described in U.S. Pat. No. 3,878,652 issued Apr. 22, 1975 and assigned to Robotics, Incorporated. The manipulator shown in U.S. Pat. No. 3,878,652 comprises an electromechanical device, however, wherein control cams are employed to generate electrical signals that then are used to control the action of an electrohydrolic servopositioning mechanism. In contrast to the electromechanical device described in U.S. Pat. No. 3,878,652, the present invention comprises a purely mechanical system for achieving automatic positioning of the working head of a machine tool with which it is used.

As best seen in FIG. 3 of the drawings, the base or housing member 11 has supported therein the mechanical positioning apparatus which is comprised by a pair of relatively large diameter, disc-type control-drive cams 16 and 17 which are secured in parallel planes on a vertically arrayed common drive shaft 18 driven at a predetermined constant speed by a motor 19 through a gear box 20 also mounted on the base member 11. The common drive shaft 18 is supported on the base member 11 by suitable antifriction bearings (not shown) for the rotating relatively large diameter disc-type control-drive cams 16 and 17. As indicated in FIGS. 2 and 3, the large diameter disc-type cam 16 drives the positioning apparatus in the y axis direction and the disc cam 17 drives the apparatus in the x-axis direction. For this purpose, each of the cams has a control-drive cam surface cut in the form of a groove, indicated by dash-dot line 21 in FIG. 2 and 22 in FIG. 4, which define the path of movement that will be followed by the working head of the positioning mechanism. The grooved cam surfaces are formed on the underside or bottom of the respective disc cams 16 and 17 so as to provide bidirectional control over the path of movement of the y cam follower shown at 23 in FIG. 3 and the x cam follower 24. The dash-dot lines defining the configuration or contour of the path followed by the control cam grooves 21 and 22 are merely illustrative and show how the cam followers 23 and 24 can be made to induce movement along the y and x axes, respectively. By changing the configuration of the paths of grooves 21 and 22, the pattern of movement of the working head can be changed. To facilitate such changes the cams 16 and 17 are held in place on shaft 18 by locking keys seated in key ways on shaft 18 and readily removable locking collars. Cams 16 and 17 are of a relatively large diameter of the order of 20-40 inches and the control cam grooves 21 and 22 form a continuous closed path lying within the radius of the cams. Hence, the radius of the cams defines the scope of movement of the respective cam followers as shown by the arrow 25 in FIG. 2 and the arrow 26 in FIG. 4.

Figure 4:
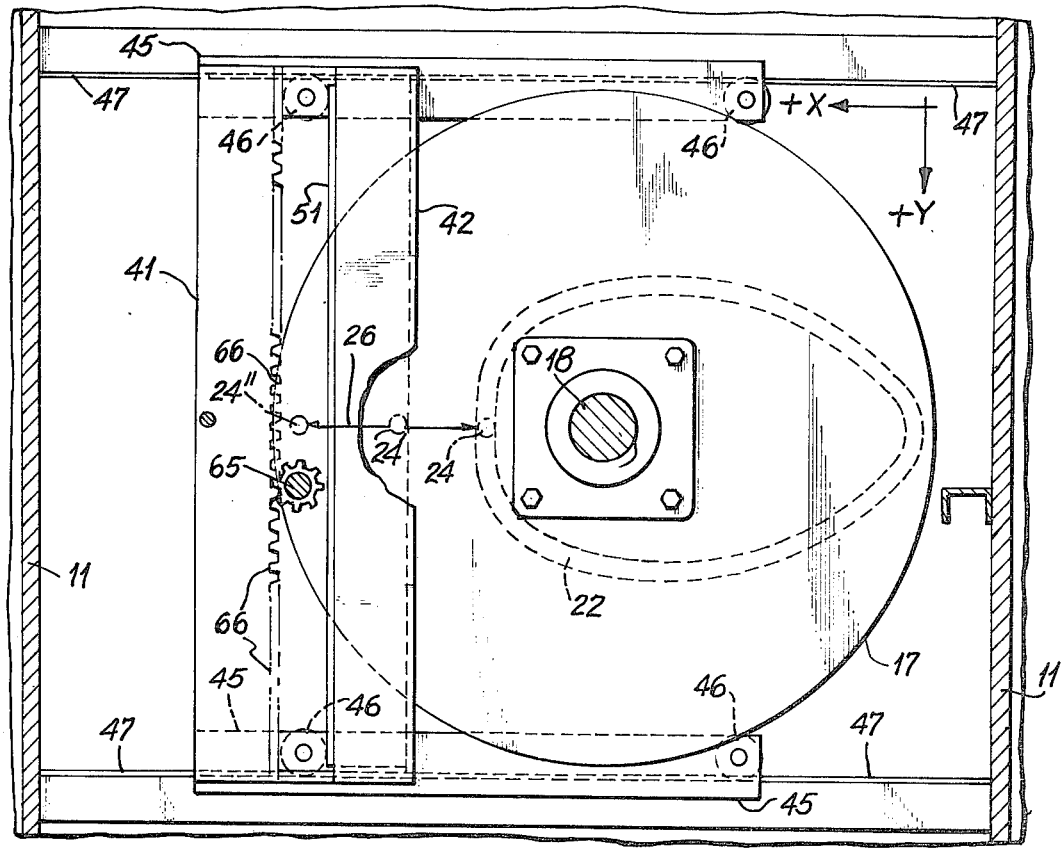
FIG. 4 is a fragmentary horizontal sectional view taken on the line 4—4 of FIG. 3.

The precise configuration of the control cam groove paths 21 and 22 will be dependent upon the particular pattern of movement desired for the working head 15A mounted at the end of the boom 15. The configuration of the groove path is designed to include the kinematics of the cam follower, linkage and transport mechanism to be described hereinafter so that the path of the control grooves will be different from the pattern of movement traced out by the working head. As depicted in FIGS. 2 and 4 of the drawings, the circumferential extent of the control cam groove paths will be rather substantial due to the substantially large diameter of the disc cams 16 and 17 on which they are formed. As a consequence, a considerable amount of detailed control information can be compacted into the control cam groove paths surfaces thereby providing intricate and detailed control over the path of movement of the working head of the positioning apparatus. This control will of course be dictated by the program of movement built into the contour of the control cam grooves 21 and 22 in accordance with established and known control cam construction techniques as explained more fully in U.S. Pat. No. 3,878,652 mentioned above.

Figure 5:
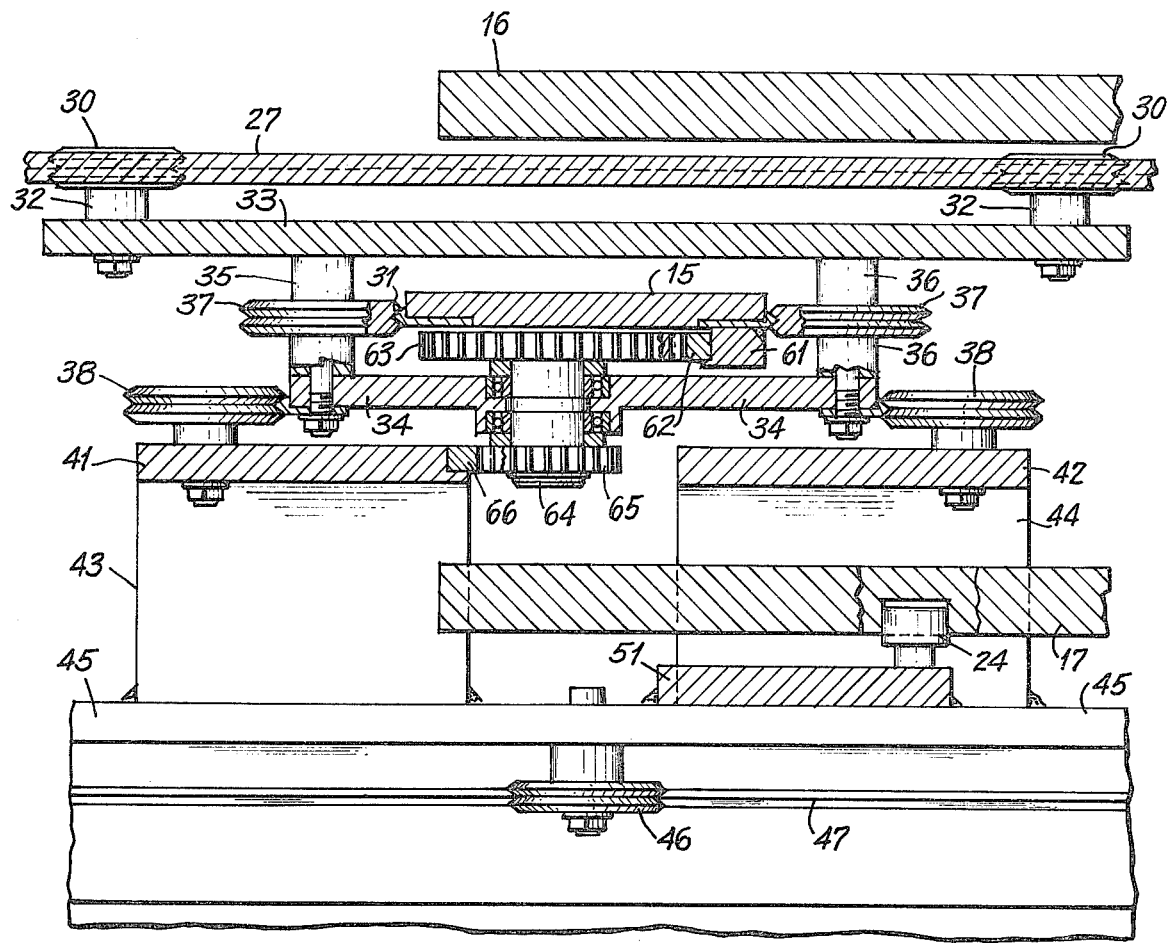
FIG. 5 is an enlarged fragmentary vertical sectional view taken on the line 5—5 of FIG. 2.
Figure 6:
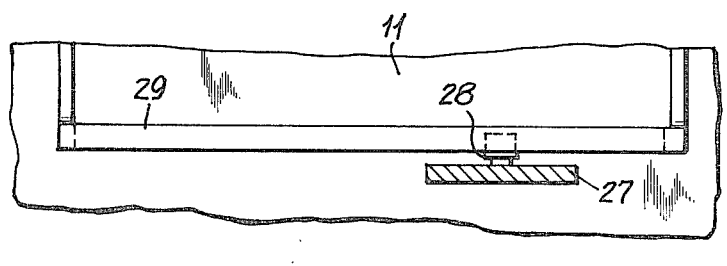
FIG. 6 is a fragmentary vertical sectional view taken on the line 6—6 of FIG. 2.

The y cam follower 23 is connected to and drives a y driver linkage arm 27 best seen in FIGS. 2, 3 and 5 of the drawings. The end of the y driver linkage arm 27 remote from cam follower 23 has secured to it a y driver guide cam follower 28 which rides in a slot formed in a y driver guide 29 secured to the base or housing member 11 for isolating the y driver mechanism from the action of the x axis driver mechanism as best shown in FIGS. 2 & 6 of the drawings. The y driver linkage arm 27 has a v-shaped track secured to its outer edges which coacts with the complimentary v-shaped surfaces of a set of four y driver support guide wheels 30 in a manner similar to that shown in the partial cross section at 31 in FIG. 5. The y driver guide wheels 30 rotatably suport the y driver linkage arm 27 and in turn are rotatably mounted by antifriction bearings on pedestals 32 secured on a y driver carriage base member 33. The construction of the wheels 30 and tracks mounted on the outer edges of the y driver linkage member 27 are such that the wheels 30 movably support the weight of the linkage member 27 thereby minimizing to the greatest possible extent frictional drag between the y driver linkage arm 27, cam follower 23 and the control cam groove 21 formed on the under-surface of the y driver cam 16. In addition to minimizing frictional effects by so arranging the control cam groove on the under-surface of the control-drive cam 16, the control cam groove 21 further is protected from the depostion of dirt, waste or other bits of matter which otherwise might fall into the grooves and impair smooth rolling contact between the cam surface of control groove 21 and the cam follower 23. As will be explained more fully hereinafter, the weight of the y driver guide support wheels 30, pedestals 32 and the y driver carriage base member 33 is in turn supported by the x axis driver carriage on wheeled supports as will be explained more fully hereinafter.

As best shown in FIG. 5, the y driver carriage base member 33 also has a set of downwardly depending pedestal support members 35 and 36 on which are mounted by suitable antifriction bearings a set of outer boom supporting guide wheels 37 of which there are a total of 4 as shown in FIG. 2. The outer boom supporting guide wheels 37 coact with complimentary v-shaped tracks having the configuration shown at 31 in FIG. 5 secured to the outer edges of the movable outer boom 15 so as to allow the outer boom member 15 to move into and out of the plane of the paper as shown in FIG. 5.

The pedestals 35 and 36 have lower portions which extend beyond the outer boom supporting guide wheels 37 on which an offset inner boom member 34 is mounted. The inner boom member 34 has secured to its outer edges a set of v-shaped tracks extending into the plane of the paper as shown in FIG. 5 and which coact with a set of four complimentary v-shaped inner boom support wheels 38. The inner boom support wheels 38 in turn are rotatably supported by antifriction bearings on a set of offset and spaced-apart, x-axis upper carriage support members 41 and 42 which in turn are secured between a set of two x-axis carriage lower support members 45 by respective upright support plates 43 and 44. The set of two spaced apart, elongated x-axis carriage lower support members 45 are mounted with their longitudinal axes extending in the x-axis direction as shown in FIGS. 3 and 4, and are movably supported for movement in the x-axis direction by a set of four v-grooved x-axis carriage support wheels 46 rotatably mounted on the respective x-axis carriage lower support members 45 by antifriction bearings. The x-axis carriage support wheels 46 in turn roll upon and are supported by a set of inwardly projecting (as viewed in FIG. 4) complimentary v-shaped rails 47 secured to the innner surface of the outer housing or base member 11.

From a consideration of the above description in conjunction with FIGS. 4 and 5 of the drawings, it will be appreciated that the set of offset and spaced apart, x-axis upper carriage support members 41 and 42 extend between the two spaced apart x-axis carriage lower support members 45 so that the y-axis carriage, which is comprised by the inner boom member 34 and the y driver base member 33 together with the outer boom member 15 and the outer boom member guide wheels 37, is free to move on the inner boom support guide wheels 38 in and out of the plane of the paper as shown in FIG. 5 and transversely across the width of the apparatus as shown in FIG. 4. While moving in this direction, which is defined as the y-axis direction, the y-axis carriage will be prevented from moving in either x-axis direction by the y-driver guide 29 and y-driver cam follower 28. It is this mechanism which prevents interaction between the y-driver mechanism and the x-driver mechanism and provides isolation between the two mechanisms.

Referring now again to FIGS. 4 and 5, the x-axis movement is induced in the apparatus by the x-axis, large diameter, disc-type control-drive cam 17 having a cam surface such as that defined by the dash-dot line 22 in FIG. 4 formed in its undersurface. The cam groove 22 has a cam follower 24 shown in FIG. 5 riding therein which is fixed to a crossarm linkage beam 51 mounted under the member 42 and extending between the two x-axis carriage lower support members 45. It will be seen in FIG. 4 that as the x-axis drive cam 17 rotates, the cam follower 24 will be caused to move from a position such as that shown at 24 to 24' and thence to 24" and then back along the x-axis due to the configuration of the cam surface groove 22. The movement of the cam follower 24 which is directly connected to the cross arm beam 51 causes the x-axis carriage comprised by lower support members 45 to move right or left as viewed in FIGS. 4 or 5 through the medium of the x-axis carriage roller wheels 46 and coacting tracks 47. Any movement of the x-axis drive cam 17 will be isolated from movement induced in the y driver carriage by the y-axis drive cam 16 due to the y driver guide 29 and y driver guide follower 28.

It will be appreciated from the foregoing description that as the x-axis control-driver cam 17 causes the x-axis carriage to move back and forth along the x-axis to a preprogrammed position depending upon the predesigned contour of the cam groove 22 formed in its undersurface, the y-axis drive cam simultaneously will be positioning the y-axis carriage back and forth in the y direction depending of course upon the contour of the y cam groove 21. The composite effect of the positioning of the transport mechanism that is comprised by the x-axis carriage and the y carriage, results in the predetermined positioning of the outer boom member 15 in accordance with the pattern of movement originally programmed into the contour or configuration of the grooved cam surfaces 21 and 22. The inclusion of the wheel and track elements as movable support means in the apparatus serves to reduce friction in the apparatus to the greatest possible extent. To further reduce dynamic forces within the apparatus to a minimum, it is desirable that all of the components (except perhaps the outer base support member exterior housing 11) are formed from light weight durable materials such as aluminum or high strength polymer plastic. It is particularly desirable that the cam followers, the movable linkage arms and all of the elements of the transport mechanism comprised by the x-axis carriage and the y driver carriage described be fabricated from such light weight materials.

It should be further noted that the design of the apparatus is such that plane of x-y movement induced in the transport mechanism is parallel to the planes of the large diameter, disc type, x and y control-drive cams. This feature of design further reduces frictional forces within the apparatus and helps to maintain dynamic forces acting on and within the apparatus to a minimum. Further, as best seen in FIG. 3, by so designing the apparatus, the large diameter, disc type control-drive cams, which are an essential characteristic of the apparatus, can be so mounted relative to the linkage arms and transport mechanism that the latter can be made to interleave with, and overlie the x-axis drive cam 16. Consequently, the machine can be built as a comparatively compact structure.

While the apparatus as described thus far is adequate to perform a number of different job applications satisfactorily, the scope of the apparatus would be somewhat limited due to the limited scope of movement provided for the outer boom 15 which supports the working heads 15A and 15B. It will be appreciated from the description thus far provided, that the scope of movement of the working heads would be limited to the scope of movement of the cam followers as depicted by the arrow 24 in FIG. 4 and the arrow 25 in FIG. 2. In order to overcome this limitation, the invention further provides mechanical movement amplifying means which are supported on the transport mechanism and act on the boom on which the working head is mounted for amplifying and extending the movement translated to the working head by the transport mechanism along at least one axis of movement. This mechanical movement amplifying means is best seen in FIGS. 2 and 5 of the drawings. As shown in FIG. 5 the outer boom member 15 has secured to its under right hand edge an offset shoulder portion 61 on which a set of rack teeth 62 are formed. The rack teeth 62 coact with teeth of a pinion gear 63 in the manner of a rack and pinion drive gear arrangement, and extend clear across the longitudinal dimension of the outer boom member 15 as best seen in FIG. 2 of the drawings. The pinion gear 63 is pinned or otherwise secured to a short stub drive shaft 64 that is journaled in antifriction bearings by the offset lower inner boom member 34. It will be recalled that the offset lower inner boom member 34 is secured by pedestals 35 to the y driver carriage support member 33 and is driven along the y-axis into or out of the plane of the paper as shown in FIG. 5 by the y-axis movement of the y driver linkage arm 27. Movement of y driver linkage arm 27 is produced by the cam follower 23 that tracks the grooved cam surface 21 in the y-axis control-drive disc cam 16.

To mechanically magnify the y-axis movement of the transport mechanism, the short stub drive shaft 64 has pinned to its lower end a differential pinion gear 65 that coacts with a set of rack teeth 66 secured across the entire traverse extent of the x-axis carriage upper support member 41 which recall is secured between the x-axis carriage lower support members 45 as best seen in FIG. 2. Consequently, as movement is imparted to the y driver carriage, the rack and pinion action of 65, 66 will cause the larger diameter pinion gear 63 to extend the scope of movement of the outer boom member 15 by an amount determined by the formula $G = D_1 + D_2/D_1$ where $D_1$ is the diameter of the lower pinion gear 65 and $D_2$ is the diameter of the larger upper pinion gear 63 that drives the outer boom member 15. It is believed obvious to one skilled in the art that by appropriately tailoring the respective diameters of the pinion gears 65 and 63, any desired magnification of the scope of movement of the outer boom member 15 can be achieved within limits set by the size of the apparatus in question. While the arrangement shown in FIG. 5 is tailored to provide mechanical amplification to the movement in the y-axis direction, it is believed obvious that a similar structure could be employed to provide mechanical amplification to the movement in the x-axis direction separately or in conjunction with the y-axis movement amplification to thereby greatly increase the size of pattern movement that can be achieved with the working head of the apparatus.

In order that the working head 15A, 15B will be provided with control signals for actions to be taken at different predetermined points along the pattern of movement thereof, the apparatus includes a controller-actuator disc 71 best shown in FIGS. 2 and 3 of the drawings. The controller-actuator disc 71 is mounted coaxially with the large diameter, disc-type control-drive cams 16 and 17 and includes a plurality of peripherally adjustable switching fixtures, one of which is shown at 72, secured to its periphery for coacting with a micro-switch or the like shown at 73 secured to the housing member 11 and arranged to be engaged by the fixture 72 upon the latter element being rotated past the micro-switch. If desired, a plurality of micro-switches can be arrayed around the periphery of the controller-actuator disc at differing radii for engagement by selected fixtures such as 72 to thereby provide a number of different encoded electrical auxiliary signals for use in conjunction with the movement of the working head. For example, such auxiliary electrical signals could be employed to commence dispensement of a mastic, stop dispensement of a mastic, lift or lower the working head nozzle, or other similar auxiliary operations generally required with an automatic working tool of the type envisioned. The actuator-controller disc 71 is designed to rotate on the common drive shaft 18 in synchronism with the control-drive cams 16 and 17 and preferably the fixtures 72 are structured so that their angular position along the periphery of the actuator disc can be adjusted to optimize the timing of the production of the auxiliary control signal relative to the pattern of movement being carried out by the working head of the apparatus.

FIGS. 7, 8 and 9 portray a different version of the novel cam controlled automatic positioning apparatus constructed in accordance with the invention. In the embodiment of the invention shown in FIGS. 7, 8 and 9 mechanical amplification of the movement induced in the cam follower is obtained by means of a novel swinging arc linkage in place of the telescoping boom and differential gear arrangement described with respect to the species of the invention shown in FIGS. 1 through 6 of the drawings. In the embodiment of the invention shown in FIGS. 7-9, like parts of the species shown in FIGS. 1-6 have been given corresponding reference numbers to facilitate understanding of the embodiment shown in FIGS. 7-9. In this embodiment, as shown in FIG. 8, an electric motor 19 drives a common drive shaft 18 through a gear box 20 on which the large diameter, disc-type control-drive cams 16 and 17 are keyed in common with a controller-actuator disc 71. In this embodiment of the invention, as is true with the species shown in FIGS. 1-6, the plane of the x-y movement induced in the boom member on which the working head of the tool is supported, is parallel to the planes of the large diameter, x and y control-drive cams. This facilitates interleaving and overlying the linkages and transport mechanism with the large diameter cams so that the entire structure can be fabricated in a compact manner. In addition, the arrangement of the planes of the cam parallel to the plane of the x-y movement of the transport mechanism and the boom member on which the working tool is supported, greatly reduces frictional resistance encountered by the transport mechanism and its associated linkages.

As is best seen in FIGS. 7 and 8, the cam follower 23 employed in connection with the y-axis drive cam 16 is mounted on a linkage arm 27A intermediate a linkage pivot shaft 74 and the swinging arc end of the linkage arm 27A which is connected by a pivot 75 to an intermediate coupling link 27B that in turn is pivotally connected to a rectangular plate-shaped y-axis linkaged member 27C having a plurality of weight lightening holes cut through it. As is best seen in FIGS. 8 and 9, the rectangular plate-shaped linkage member 27C has v-shaped tracks secured to its outer edges which ride in complementary v-shaped support wheels 30 that are freely rotatable. By this arrangement, as viewed in FIG. 7, the y-axis drive linkage member 27C is free to move right or left as viewed in FIG. 7 within the support wheels 30.

As the y-axis drive cam 16 rotates, the cam surface groove corresponding to 21 in FIG. 2 will cause the cam follower 23 to be moved up or down as viewed in FIG. 7 thus causing the swinging arc end of the linkage arm element 27A to be moved between the extreme positions 27A' and 27A" as shown in FIG. 7. This in turn will cause the y-axis drive linkage member 27C to drive the transport mechanism supporting the boom member 15 on which the working head is secured up or down along the y-axis as viewed in FIG. 7.

Referring again to FIG. 9 of the drawings, it will be seen that the freely rotating support wheels 30 journaled in antifriction bearings are supported by pedestals 32 secured on a y-axis carriage support member 33. The y-axis carriage support member 33 in turn is secured to and carries the boom member 15 as best seen in FIG. 8. Boom member 15 has suitable v-shaped tracks secured to its lower outer edges which tracks correspond in shape and function to the track 31 shown in FIG. 5. The tracks on boom member 15 ride in and are supported by freely rotating y-axis carriage support wheels 37 that are mounted in antifriction bearings supported on pedestals 35 that in turn are secured to the x-axis carriage support member 45. The x-axis carriage support member 45 on its undersurface has a second set of support pedestals on which x-axis carriage support wheels 46 are mounted in a freely rotating manner. Support wheels 46 coact with and are supported by complimentary shaped track elements 47 secured to the base member 11 that comprises part of the outer housing of the structure.

As best shown in FIG. 7, the x-axis carriage support member 45 is pivotally secured to a connecting link 76C which in turn is connected by a pivotal coupling 76B to a swinging arc linkage arm 76A. The swinging arc linkage arm 76A is pivotally supported at one end by a pivot post 77 and at the remaining free swinging arc end to linkage arm 76C by the coupling 76B. An x-axis movement inducing cam follower 24 is mounted on the swinging arc linkage arm 76A at a point intermediate the pivot post 77 and the free swinging end of the linkage arm connected by coupling 76B to linkage member 76C. By this constuction, rotation of the x-axis, large diameter, disc-type control-drive cam 17 will cause the cam follower 24 to be moved right or left depending upon the contour of the grooved cam surface on its underside thereby causing the free swinging arc end of linkage arm 76A to move the x-axis carriage base member 45 right or left along the x-axis through the medium of tracks 47 and support rollers 46.

In operation, the embodiment of the invention shown in FIGS. 7-9 functions in a manner similar to that described with the species of FIGS. 1-6 the following exception. Because of the extended length of the swinging arc linkage arm 27A in the y drive mechanism and 76A in the x-axis drive mechanism, it will be seen that there will be a considerable amplification of the scope of movement over that provided by the movement of the respective cam followers 23 and 24 alone. As stated previously, the scope of movement of the cam followers will be dictated by the radius of the large diameter, disc-type control-drive cams. However, due to the extended swinging arm linkages, this scope of movement is amplified by a lever arm directly proportional to the length of the linkage arms 27A and 76A, respectively. It will be noted in FIG. 7, that tolerance is provided in the x-y transport mechanism comprised essentially by the sets of rollers 30, 37 and 46 base member 45 and boom member 15 for freedom of movement of the transport mechanism along either the x or y axis. This freedom of movement along both the x and y axes is to tolerate arcuate travel of the swinging arc linkage arms 27A and 76A while moving, for example, from 27A' to 27". It is preferred, however, that the arcuate path movement of linkage arms 27A and 76A be compensated by appropriately tailoring the contour or configuration of the cam surface grooves corresponding to 21 in FIGS. 2 and 22 in FIG. 4 so as to convert the actual motion to rectilinear motion at the transport mechanism. The manner in which such compensation can be built into the configuration of the cam surface grooves is believed to be well within the knowledge of persons skilled in control cam design and fabrication.

In addition to the above features, it is believed obvious to one skilled in the art that the positioning apparatus could be so constructed that the relatively large diameter, disk-type control-drive cams each are provided with at least two different control cam grooved surfaces formed thereon for producing respective different preprogrammed patterns of movement by the working head of the apparatus. That is to say, instead of just a single control cam groove such as 21 for the y-axis control-drive cam and 22 for the x-axis control-drive cam, each of the two cams has two different control cam groove surfaces formed on it. Additional means which may be either manually operated or automatically operated are provided for selecting desired ones of the control cam groove surfaces for controlling the movement of the apparatus. It is preferred that the controller-actuator disk where used include at least two separate sets of electrical encoding means peripherally arrayed around the controller-actuator disk for producing auxiliary function electrical control signals for respective ones of the different preprogrammed patterns of movement of the working head, and the apparatus further include program selector means coacting with the controller-actuator disk and the electrical encoding means as well as the respective cam followers and their interconnected linkage arms for automatically selectively conditioning the apparatus for carrying out a desired one of the different preprogrammed patterns of movement in accordance with the output of the program selector means as selected by an operator of the equipment. In addition to these features, the positioning apparatus preferably may employ motor means for driving the large diameter disk-type control-drive cams which is reversible and further includes motor control means for controlling the direction of rotation of the motor means and hence the direction of rotation of the control-drive cams for reversing the direction of cam rotation. The motor control means may of course be made responsive to the controlling output of the program selector means. With such an arrangement, for job operations where the beading path of the mastic is such that the path direction is reversible, lost motion of the cams can be minimized by reversing their direction of rotation upon completion of each item being worked on by the apparatus.

From the foregoing description, it will be appreciated that two entirely different structural arrangements have been described for providing mechanical amplification of the movement induced by the large diameter, disk-type control-drive cams. While each has been described separately, it is believed obvious to one skilled in the art that the two arrangements could be coupled together to provide an extremely wide scope of movement within an apparatus of compact design by appropriately utilizing either or both types of mechanical movement amplification in a single apparatus depending upon the application desired. Accordingly, the invention makes available an automatic positioning mechanism for automatically moving the working head of a machine tool or other similar device through a preprogrammed pattern of movement. The automatic positioning mechanism which has been provided is simple in design, relatively low cost to construct and operate, and reliable in operation and easy to maintain in that it employs simple mechanical disk cams both to control the pattern of movement and to drive the apparatus.

Having described two different preferred embodiments of a low cost cam controlled positioning apparatus constructed in accordance with the invention, it is believed obvious to those skilled in the art that other modifications and variations of the invention will be suggested in the light of the above teachings. It is therefore to be understood that changes may be made in the particular embodiments of the invention described which are within the full intended scope of the invention as defined by the appended claims.

What is claimed is:

1. A low cost cam controlled mechanical positioning apparatus for automatically tracing out a predetermined path of movement for the working head of a machine tool or the like, said apparatus comprising boom means for supporting a machine tool working head, a set of at least two relatively large diameter disk-type control-drive cams for respective x-y axis direction movement secured in parallel planes on a common drive shaft rotatably supported on a base member, motor means mounted on said base member and coupled to said common drive shaft for rotating said common drive shaft and said control-drive cams at a predetermined speed of rotation, cam follower means engaging respective x-y axis movement inducing cam surfaces formed on respective ones of said control-drive cams, linkage means coupled to respective ones of said cam follower means for translating movement of the cam follower means to the boom means to thereby move the machine tool working head along a predetermined path of movement in an x-y plane, a transport mechanism for supporting and moving said boom means, said transport mechanism comprising respective x and y axis carriage means each movably supported on wheel and track means and mounted for movement along respective x and y axes independently one from the other and with one of the carriage means being supported by and movable with the other carriabe means, at least one of said wheel and track means being mounted on said base member and movably supporting said respective carriage means, means coupling said linkage means to and driving said transport mechanism such that the plane of the x-y movement of the transport mechanism is parallel to the planes of the control-drive cams with the control-drive cams being supported on the base member in a position to overlie and interleave with the linkage means and the transport mechanism to form an apparatus that is compact in construction.

2. A positioning apparatus according to claim 1 wherein the relatively large disk-type control-drive cams are generally circular in shape and have a diameter of the order of 20 to 40 inches with control-drive cam surfaces being formed at any point along a radius of the cam whereby the radius defines the full stroke of movement of the cam follower means.

3. A positioning apparatus according to claim 2 wherein the control-drive cam surfaces comprise grooves formed in corresponding flat surfaces of the disk-type control-drive cams with the grooves being double acting in effect whereby bidirectional control of movement of the cam follower means is achieved, and the common drive shaft is mounted with its axis extending in a vertical up-down direction and the flat surfaces of the control-drive cams on which the grooves are formed are downwardly disposed whereby the control-drive cam surfaces are protected from the deposition of dirt or other matter and minimal frictional contact resistance with the cam follower means is achieved.

4. A positioning apparatus according to claim 3 wherein the cam follower means, the linkage means and the transport mechanism all are constructed of light weight durable material whereby minimum inertia effects are attained and dynamic forces acting on the apparatus are maintained at a low level.

5. A positioning apparatus according to claim 1 wherein the contour of the control-drive cam surfaces and the path of movement of the working head are different in configuration.

6. A positioning apparatus according to claim 4 wherein the contour of the control-drive cam surfaces and the path of movement of the working head are different in configuration.

7. A positioning apparatus according to claim 1 further including mechanical movement amplifying means secured to said transport mechanism and acting on the boom means on which the working head is mounted for amplifying and extending the movement translated to the working head by the transport mechanism along at least one axis of movement.

8. A positioning apparatus according to claim 7 wherein said mechanical movement amplifying means is comprised by telescoping boom means and differential gear means for telescopically extending the telescoping boom means, said differential gear means being responsive to movement of the transport mechanism along at least one axis of movement for mechanically amplifying movement induced in the transport mechanism along the said one axis of movement by the control cam surface and the cam follower and linkage means.

9. A positioning apparatus according to claim 6 further including mechanical movement amplifying means supported on said transport mechanism and acting on the boom means on which the working head is mounted for amplifying and extending the movement translated to the working head by the transport mechanism along at least one axis of movement.

10. A positioning apparatus according to claim 9 wherein said mechanical movement amplifying means is comprised by telescoping boom means and differential gear means for telescopically extending the telescoping boom means, the differential gear means being responsive to movement of the transport mechanism along at least one axis of movement for mechanically amplifying movement induced in the transport mechanism along the said one axis of movement by the control cam surface and the cam follower and linkage means.

11. A positioning apparatus according to claim 1 further including a controller-actuator disk mounted coaxially with the disk-type control-drive cams on the rotatable drive shaft and further including a electrical encoding means peripherally arrayed around said controller-actuator disk and engageable thereby at certain peripheral points during rotation of the disk whereby electrical control signals are produced for controlling desired auxiliary functions at predetermined points in the path of movement of the working head.

12. A positioning apparatus according to claim 6 further including a controller-actuator disk mounted coaxially with the disk-type control-drive cams on the rotatable drive shaft and further including an electrical encoding means peripherally arrayed around said controller-actuator disk and engageable thereby at certain points during rotation of the disk whereby electrical control signals are produced for controlling desired auxiliary functions at predetermined points in the path of movement of the working head.

13. A positioning apparatus according to claim 1 wherein said disk-type control-drive cams include means providing for said cams to be readily removed and replaced with other disk-type control-drive cams having differently programmed control cam surfaces formed therein for producing a different pattern of movement for the working head.

14. A positioning apparatus according to claim 12 wherein said disk-type control-drive cams include means providing for said cams to be readily removed and replaced with other disk-type control-drive cams having differently programmed control cam surfaces formed therein for producing a different pattern of movement for the working head.

15. A positioning apparatus according to claim 1 wherein said linkage means move along paths which are defined by straight line extensions of a radius of the large diameter disk-type control-drive cams.

16. A positioning apparatus according to claim 14 wherein said linkage means move along paths which are defined by straight line extensions of a radius of the large diameter disk-type control-drive cams.

17. A positioning apparatus according to claim 7 wherein said linkage means comprises at least one pivoted swinging arc linkage arm having its respective cam follower means engaging an intermediate point thereon between a pivoted end and a swinging arc free end for mechanically amplifying the scope of movement induced by the control-drive cam and cam follower means at the swinging arc free end, the swinging arc free end of the respective linkage arm being connected to the transport mechanism for providing a greater scope of movement thereto than the scope of movement provided by the cam follower means alone.

18. A positioning apparatus according to claim 14 wherein said linkage means comprise at least one pivoted swinging arc linkage arm having its respective cam follower means engaging an intermediate point thereon between a pivoted end and a swinging arc free end for mechanically amplifying the scope of movement induced by the control-drive cam and cam follower means at the swinging arc free end, the swinging arc free end of the respective linkage arm being connected to the transport mechanism for providing a greater scope of movement thereto than the scope of movement provided by the cam follower means alone.

19. A positioning apparatus according to claim 1 wherein the motor means driving the large diameter disk-type control-drive cams is reversible and further including motor control means for controlling the direction of rotation of said motor means and hence the direction of rotation of said control-drive means for reversing the direction of cam rotation for minimizing lost motion of the cams.

20. A positioning apparatus according to claim 18 wherein the motor means driving the large diameter disk-type control-drive cams is reversible and further including motor control means for controlling the direction of rotation of said motor means and hence the direction of rotation of said control-drive cams for reversing the direction of cam rotation for minimizing lost motion of the cams.

* * * * *